United States Patent [19]

Ukai et al.

[11] 4,421,971
[45] Dec. 20, 1983

[54] ARC WELDING PROCESS

[75] Inventors: Jun Ukai; Toyozo Tetsu; Kunio Shamoto, all of Aichi, Japan

[73] Assignee: Mitsubishi Denki Kabushiki Kaisha, Tokyo, Japan

[21] Appl. No.: 197,102

[22] PCT Filed: Feb. 29, 1980

[86] PCT No.: PCT/JP80/00037
§ 371 Date: Sep. 16, 1980
§ 102(e) Date: Sep. 16, 1980

[87] PCT Pub. No.: WO80/01771
PCT Pub. Date: Sep. 4, 1980

[30] Foreign Application Priority Data

Mar. 1, 1979 [JP] Japan .................. 54-23861

[51] Int. Cl.³ ................................. B23K 9/00
[52] U.S. Cl. .................... 219/128; 219/122
[58] Field of Search ............ 219/122, 128; 1/61

[56] References Cited

U.S. PATENT DOCUMENTS 1,638,336  8/1927  Himes ............... 219/122 X
3,838,243  9/1974  Inagaki .............. 219/122

Primary Examiner—Elliot A. Goldberg
Attorney, Agent, or Firm—Oblon, Fisher, Spivak, McClelland & Maier

[57] ABSTRACT

An arc welding process for welding a circumferential surface of a fixed pipe etc. by shielding a work part with a shield gas is provided. It is welded by a flat arc formed in a flat sectional view by simultaneously ejecting a gas from nozzles (19) to the arc formed between a welding torch (10) and a product for welding by placing a pair of the gas nozzle (19) for ejecting the gas at the end of the welding torch (10).

7 Claims, 17 Drawing Figures

ARC WELDING PROCESS

BACKGROUND OF THE INVENTION

1. Field of the Invention

The present invention relates to an improvement of an arc welding process for welding a circumferential surface of a fixed pipe etc. by shielding a work part with an inert gas etc.

2. Description of the Prior Art

Heretofore, the apparatus shown in FIG. 1 has been known as an apparatus for arc welding for such purpose. FIG. 1 shows a welding apparatus for automatically welding an outer surface of a fixed pipe wherein (1) designates a welding head; and the welding head (1) automatically weld a joint of the fixed pipe (2) under rotating along a guide rail (3) around the fixed pipe (2); (4) designates a power source for welding which feeds work energy to the welding head (1); (5) designates a controller for controlling the work energy and the speed for feeding a filler wire for the automatic welding; (6) designates an operation box for commands for start and stop of the welding and sets of conditions for the welding by a manual operation; (7) designates a power cable for connecting the power source (4) for the welding and the welding head (1); (8) and (9) respectively designate control cables for connecting between the controller (5) and the welding head (1) and between the controller (5) and the operation box (6).

FIG. 2 shows the welding head (1) in detail wherein (10) designates a welding torch which has an electrode (11) for generating arc between the fixed pipe (2) and a structure for mechanically oscillating the electrode (11) to the direction perpendicular to the welding line; (12) designates a shield gas nozzle which covers the welded part and flows a shield gas such as an inert gas for protecting from air; (13) designates a fine adjuster for finely adjusting the welding torch (10) to the work part of the fixed pipe (2) in vertical and transversal directions; (14) designates a wire feeder to feed a filler wire (16) wound on a wire reel (15) to the work part; (17) designate a truck which runs on the guide rail (3) to turn around the fixed pipe (2) and the welding torch (10) and the wire feeder (14) etc. are mounted on the truck (17).

In the circumferential welding of the fixed pipe by the automatic welding apparatus, butt (2A) of all end surface of the fixed pipe (2) in a form of V-shape or U-shape groove shown in FIG. 3(a), 3(b) is welded from the outer surface of the fixed pipe (2). In the welding process, especially the welding for a first layer welding, it is necessary to form a convex penetration bead (2B) in the inner side of the fixed pipe (2) (referring to FIG. 4(a), 4(b)). In the circumferential welding of the fixed pipe, the welding elements for all postures as shown by a clock display in FIG. 5; as substantially downward directional posture between 10 to 2 o'clock; substantially horizontal downward gain posture between 2 to 4 o'clock; substantially upward directional posture between 4 to 8 o'clock and substantially horizontal upward gain posture between 8 to 10 o'clock.

In the upward directional posture, the gravity is applied to the molten metal, the required convex penetration bead (2B) can be formed under only a remarkably limited condition for the welding. In the case varying the welding condition in timing such as the welding of the joint of the fixed pipe, the required limited condition can not be maintained in high accuracy and the penetration bead (3B) often is downwardly concaved. (Referring to FIG. 6(a), 6(b)).

SUMMARY OF THE INVENTION

The present invention is to overcome the above-mentioned disadvantages and is to provide a welding apparatus wherein a functional gas is ejected from both sides of the arc so as to form the arc for welding in a flat sectional view whereby the required penetration bead is always applied even though an accuracy of the opening of the joint is fluctuated as the welding of the fixed pipe.

In accordance with the present invention, a pair of nozzles for ejecting the functional gas are placed in both sides of the arc whereby the arc for welding can be flat by controlling the functional gas and the molten pool can be thin to increase a depth for melting.

DETAILED DESCRIPTION OF THE PREFERRED EMBODIMENT

Figure 1:
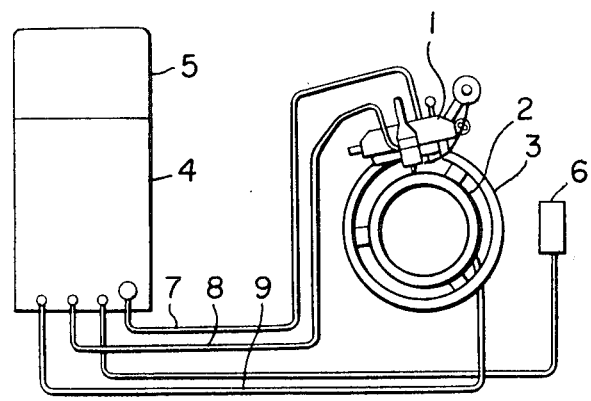
FIG. 1 is a schematic view of the conventional welding apparatus for welding a fixed pipe.

Referring to the drawings, one embodiment of the present invention will be illustrated.

Figure 2:
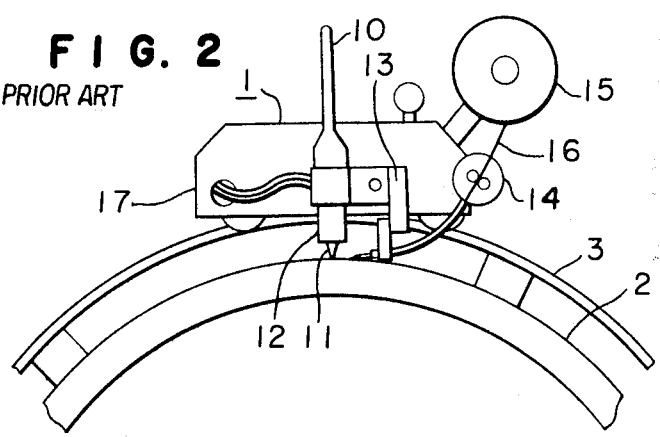
FIG. 2 is a front view of the conventional welding head.
Figure 3A:
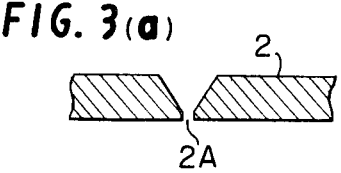
FIGS. 3(a) and 3(b) shows sectional views of a joint.
Figure 3B:
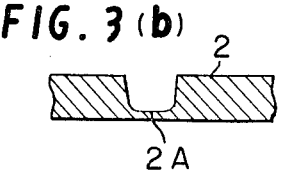
Figure 4A:
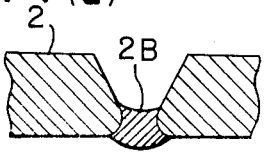
FIGS. 4(a) and 4(b) shows sectional views of a desired welded bead.
Figure 4B:
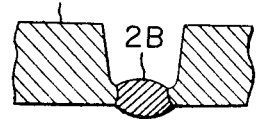
Figure 5:
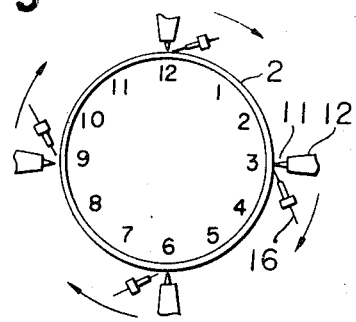
FIG. 5 is a schematic view for illustrating postures in the circumferential welding.
Figure 6A:
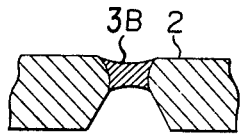
FIGS. 6(a) and 6(b) shows sectional views of an undesired welded bead.
Figure 6B:
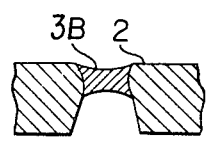
Figure 7:
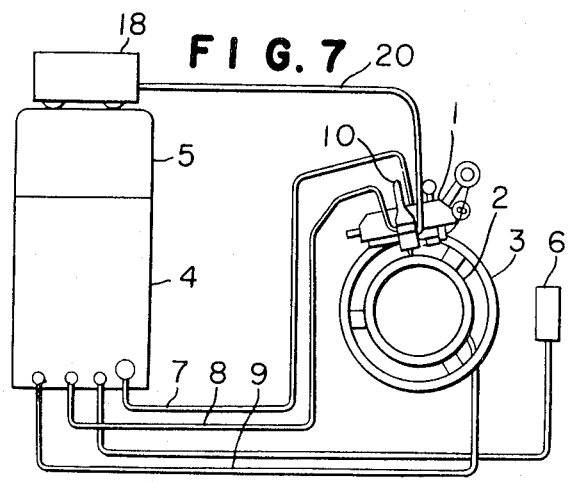
FIG. 7 is a schematic view of one embodiment of the welding apparatus for welding a fixed pipe according to the present invention.

In FIG. 7, the same reference numbers designate the same parts or the parts corresponding to the parts shown in FIGS. 1 and 2 and accordingly, the description of the parts is eliminated.

Reference number (18) designates a functional gas controller which controls the functional gas ejected from the nozzles (19) for the functional gas placed at an end of the welding torch (10) (the detail is shown in FIG. (8)). The functional gas is the same as the shield gas fed from the shield nozzle (12); (20) designates a control cable for connecting the functional gas controller (18) and the nozzles (19).

Figure 8:
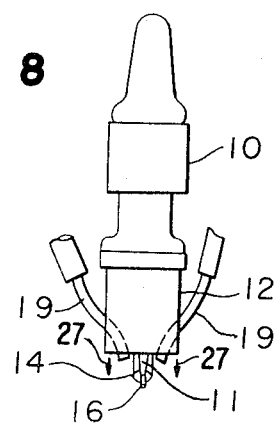
FIG. 8 is a side view of a welding torch according to the present invention.

FIG. 8 shows the welding torch (10) in detail from the direction along the welding line. In the shield nozzle (12) for feeding the inert gas so as to protect the work part, a pair of nozzles (19) for ejecting the functional gas are placed in both side of the electrode (11) to face the arc in symmetric positions, and in perpendicular to the welding line. The condition of the functional gas ejected from the pair of nozzles is controlled by the functional gas controller (18) under controlling the opening and closing of an electromagnetic valve (not shown); (16) designates a filler wire fed by the wire feeder (14).

Figure 9A:
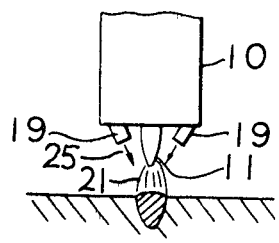
FIGS. 9(a) and 9(b) shows a configuration of a molten pool formed by the apparatus of the present invention.
Figure 10A:
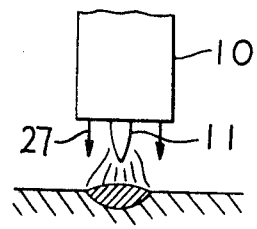
FIGS. 10(a) and 10(b) shows a configuration of a molten pool formed by the conventional apparatus.
Figure 9B:
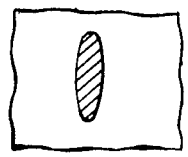
Figure 10B:
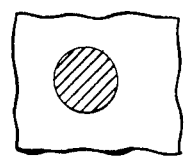

FIGS. 9(a) and 9(b) show the configuration of the welded bead on the welded product formed by the welding torch (10) having the above-mentioned structure. The arc (21) is compressed from the direction perpendicular to the welding line by the functional gas (25) ejected from the nozzles (19) to the arcing position. As a result, the arc and the molten pool are in flat conditions and the depth for melting is deeper. Incidentally, during the operation, the shield gas (27) is fed from the shield gas nozzle (12). FIGS. 10(a) and 10(b) the configuration of the molten pool effected by the conventional welding torch (10) in which any nozzle for ejection is not placed. The width of the molten pool is broad and the depth is thin.

Figure 11:
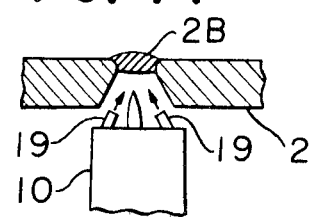
FIG. 11 is a sectional view showing a configuration of the welded bead formed on a fixed joint by the apparatus of the present invention.

FIG. 11 shows the section of the first layer bead (2B) formed at the joint of the fixed pipe (2) when the welding torch (10) having nozzles (19) for ejecting the functional gas is used for the apparatus for automatically welding peripheral part of the fixed pipe (2). The shield gas is fed to the work part and the functional gas is ejected to the arc for welding so as to be the flat arc in the direction of the welding line. The heat is concentrated to the central position and the melt bonding is decreased at the side parts to be thin front bead and the molten pool is pushed to the reverse surface of the fixed pipe (2) by the functional gas to form the convex on the reverse surface and the desired convex bead is formed. The nozzles (19) are placed in symmetrical positions to the arc whereby equal pressure can be applied from both sides to the arc so as to form a desired flat sectional view of the arc without any deformation.

It has been difficult to form a convex penetration bead in the conventional automatic welding of a fixed pipe, however, in accordancce with the welding apparatus of the present invention, it is possible to form easily a stable convex penetration bead even though an accuracy for groove is not so high.

Figure 12:
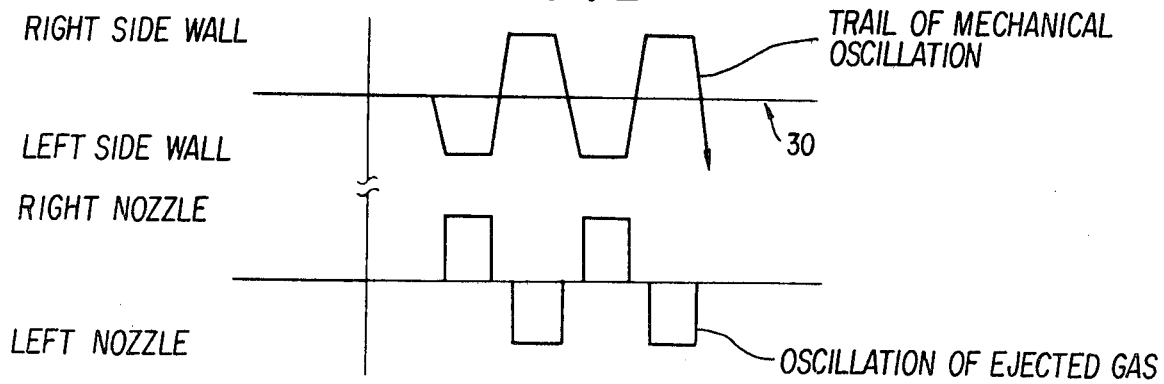
FIG. 12 shows the condition for welding the second or following layer by alternately ejecting the functional gas from a pair of nozzles under synchronizing to mechanical oscillation of the welding torch.

In the case of a multi-layer welding process, in the welding operation for a second or following layer on the fixed pipe, as shown in FIG. 12, the functional gas is alternately ejected from either nozzle of the pair of the nozzles in synchronous to the welding torch which is mechanically oscillated across the weld line (30), that is, from the right nozzle during the time swinging the welding torch to the left side wall and from the left nozzle during the time swinging the welding torch to the right side wall whereby the melt bonding of the molten pool to the left and right opening side walls is improved as the result.

In the above-mentioned embodiment, the fixed pipe is used as the product for welding by the welding torch having the nozzles for ejection. The process of the present invention is also effective for welding a work part having a narrow welded width.

We claim:

1. An arc welding process for welding along a weld line by arcing between an electrode of a welding torch and a workpiece having an outer and inner side comprising:

placing a pair of gas nozzles on opposite sides of said electrode along a line perpendicular to said weld line adjacent said outer side;

ejecting a functional gas from said nozzles toward said workpiece and toward said arc;

compressing said arc between said nozzles with said functional gas such that said arc is flattened along said weld line; and forming a convex penetration weld bead on an inner side of said workpiece irrespective of the orientation of said arc with respect to said workpiece by directing said functional gas against said bead.

2. The arc welding process according to claim 1 wherein said nozzles are placed symmetrically on opposite sides of said electrode.

3. The arc welding process according to claim 1 which further comprises ejecting a shield gas from said welding torch to said workpiece and wherein said shield gas and said functional gas comprise the same gas.

4. The arc welding process according to claim 1 wherein said step of ejecting said functional gas toward said workpiece further comprises ejecting said functional gas toward a peripheral surface of a fixed pipe.

5. The arc welding process according to claim 1 further comprising the step of welding in multiple weld layers.

6. The arc welding process according to claims 1 and 5 which further comprises oscillating said arc across said weld line and alternately ejecting said functional gas from one of said pair of nozzles such that said functional gas is ejected substantially in the same direction as the direction of said oscillation.

7. The arc welding process according to of claim 6 wherein said step of alternately ejecting said functional gas further comprises synchronizing said oscillating of said arc with said alternate ejecting of said functional gas.

* * * * *